United States Patent
Pickney (10) Patent No.: US 7,857,973 B1
(45) Date of Patent: Dec. 28, 2010

(54) SELF CLEANING PUMP VAULT FOR A SEPTIC TANK

(76) Inventor: Robert J. Pickney, 307 Patton Dr., Mt. Juliet, TN (US) 37122

( * ) Notice: Subject to any disclaimer, the term of this patent is extended or adjusted under 35 U.S.C. 154(b) by 909 days.

(21) Appl. No.: 11/743,375

(22) Filed: May 2, 2007

(51) Int. Cl.
*B01D 29/66* (2006.01)
*B01D 36/04* (2006.01)

(52) U.S. Cl. .................. 210/256; 210/298; 210/299; 210/312; 210/409; 210/532.2

(58) Field of Classification Search ............ 210/170.08, 210/256, 298, 299, 312, 313, 409, 532.1, 210/532.2, 533
See application file for complete search history.

(56) References Cited

U.S. PATENT DOCUMENTS

| | | | |
|---|---|---|---|
| 4,439,323 A | 3/1984 | Ball | |
| 4,822,486 A | 4/1989 | Wilkins et al. | |
| 5,108,592 A | 4/1992 | Wilkins et al. | |
| 5,215,656 A | 6/1993 | Stoneburner | |
| 5,356,582 A | 10/1994 | Aneja et al. | |
| 5,492,635 A | 2/1996 | Ball | |
| 5,502,808 A | 3/1996 | Goddard et al. | |
| 5,635,064 A * | 6/1997 | Bovington | 210/532.2 |
| 5,690,824 A * | 11/1997 | Stuth | 210/532.2 |
| 5,904,847 A * | 5/1999 | Bovington | 210/299 |
| 5,976,384 A | 11/1999 | Campbell et al. | |
| 5,985,139 A * | 11/1999 | Zoeller | 210/532.2 |
| 6,491,830 B1 * | 12/2002 | Batten et al. | 210/533 |
| 6,773,606 B2 * | 8/2004 | Wilkins et al. | 210/170.08 |
| 6,932,912 B2 | 8/2005 | Chaffin | |
| 7,413,656 B2 * | 8/2008 | Allen et al. | 210/256 |

OTHER PUBLICATIONS

Submittal Data Sheet, Effluent Screens, Orenco Systems Incorporated (OSI)—1999 publication.
"The Self-Cleaning Filtered Pump Vault," by John Christensen, B.S., M. Eng., http://www.zabelzone.com/Images/Zabel%20Zone/magfall00/30-31.pdf—This publication is prior art.

* cited by examiner

*Primary Examiner*—Christopher Upton
(74) *Attorney, Agent, or Firm*—Waddey & Patterson, P.C.; Phillip E. Walker (57) ABSTRACT

A self-cleaning discharge system used with a wastewater treatment system. The wastewater treatment system includes a tank for collecting wastewater while the wastewater typically includes solid particles. The discharge system comprises a housing, a filter positioned in the housing, an effluent discharge apparatus positioned inside the filter, and a venturi effect flushing system positioned proximate to the bottom of the housing. The housing includes a perimeter and at least one intake aperture positioned in the perimeter to accept the wastewater. The filter is shaped to substantially restrict flow of particles into the filter and to the discharge apparatus. The discharge apparatus is in fluid communication with the wastewater in the tank and includes a discharge path to position to transport filtered wastewater outside of the tank. The venturi effect system is in fluid communication with the housing and the tank to return the particles restricted by the filter to the tank.

16 Claims, 6 Drawing Sheets

SELF CLEANING PUMP VAULT FOR A SEPTIC TANK

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present invention relates generally to wastewater treatment systems. More particularly, the present invention relates to self-cleaning discharge systems for filtered effluent from wastewater treatment systems.

There have been numerous attempts to improve wastewater water treatment systems. These attempts have included various changes to the filter, pump, housing, and supply canisters associated with wastewater treatment systems. These attempts are generally directed at making a more efficient treatment system.

A major problem with wastewater treatment systems, and especially effluent wastewater treatment systems, is the presence of solid particles suspended in the liquid. These suspended solid particles have a tendency to clog the pathways, pipes, and passages within the systems and potentially damage or completely break the operating equipment, such as a pump, within these treatment systems. These solid particles can block the flow of fluid throughout the system by lodging or becoming stuck in an opening to a pipe or pathway or by the general collection of multiple solid particles around the filter, or screen element within these systems.

When numerous solid particles are caught by a filter, these particles tend to clog and block the flow of fluid through the filter to the pump and discharge apparatus. This clogging may cause the filter to collapse or can damage the pump by restricting some or even in extreme cases all of the fluid to the pump thereby causing overheating and malfunctioning of the pump or other discharge apparatus.

Several prior art attempts have been made to improve these treatment systems. These include U.S. Pat. Nos. 4,439,323, 4,822,486, 5,108,592, 5,215,656, 5,492,635, and 6,932,912. These patents fail to effectively prevent or reduce the amount of solid particle build up on the filter of the discharge system.

For example, U.S. Pat. No. 4,439,323 includes the use of multiple apertures specifically positioned in the pump housing at a predetermined height. This predetermined height is relative to the septic tank such that fluid drawn into the pump is drawn only from a fluid depth that is designed to specifically exclude levels of fluid within the tank, namely the top scum layer and bottom solids layer. This patent does not provide an effective solution for the reduction or elimination of solid particle build up on the filter for the pump. This patent requires a periodic shut down of the system to remove the build up of solid particles from the filter face.

U.S. Pat. No. 5,492,635 is directed at a specially designed filter that includes multiple discreet filters having a total increased filter surface area in an attempt to extend the longevity of the filter. This filter includes multiple discreet filters in an attempt to expand the time needed between cleaning maintenance operations on the pump system. This filter design attempts to decrease the number of times the water treatment system is stopped and the pump housing is opened and cleaned in order to remove the build up of solids from the filter and the bottom of the housing.

Additionally, U.S. Pat. Nos. 4,822,486, 5,108,592, and 5,215,656 are directed at rotary self-cleaning filtering systems. These systems include a nozzle that is disposed within the filter to forcibly emit water against the filter to both rotate the filter and dislodge debris from the filter. These patents are also designed to increase the time between required manual cleanings of the filtering systems when those systems are required to be shut down and the solids removed from the housing.

All of these prior art attempts to increase the functional life of the filtering systems and address the issue of the build up of solid particles within the discharge housing still require a shut down of the filtering system, manual removal of the filtering system, and manual cleaning of the housing to remove the solids built up therein.

What is needed then is a self-cleaning discharge system used in wastewater treatment systems. Preferably this self-cleaning discharge system allows solids to be removed from the discharge system with little to no manual interaction required. Additionally, preferably this self-cleaning discharge system operates in conjunction with the overall wastewater treatment system to improve the efficiencies thereof. Additionally, preferably this self-cleaning discharge system is easy to manufacture and install. This needed system is lacking in the art.

BRIEF SUMMARY OF THE INVENTION

Disclosed herein is a self-cleaning discharge system used in conjunction with a wastewater treatment system. The wastewater treatment system includes a tank for collecting wastewater while the wastewater typically includes solid particles. The self-cleaning discharge system comprises a housing, a hollow filter positioned in the housing, an effluent discharge apparatus positioned inside the filter, and a venturi effect flushing system positioned proximate to the bottom of the housing. The Venturi effect is a phenomenon of hydrodynamics which describes a drop in hydrostatic pressure along areas of high flow velocities. In this invention, a small stream of higher velocity fluid is introduced into the annular space containing lower velocity fluid; thereby flow is induced in the direction of higher velocity fluid, toward the outlet end of the annular space. This flow is a result of the Venturi effect.

The housing includes a perimeter and at least one intake aperture positioned in the perimeter to accept the wastewater. The filter is shaped to substantially restrict flow of solid particles into the filter and to the discharge apparatus. The discharge apparatus is in fluid communication with the wastewater in the tank and includes a discharge path to position to transport filtered wastewater outside of the tank. The venturi effect flushing system is in fluid communication with the housing and the tank to return the solid particles restricted by the filter to the tank.

The venturi effect flushing system can include a first apparatus that promotes or produces the venturi effect. The first apparatus, which can include a velocity flow device, can be positioned proximate the bottom of the housing. Additional apparatuses that promote or produce venturi effects can engage the housing and be spaced from the first apparatus. One or more of these apparatuses can impart a circular flow to the wastewater within the housing resulting in the cleaning and flushing of particles from the filter and housing.

The bottom of the housing can include a spiral shape. The first venturi effect causing apparatus can be integrally formed in the housing proximate the lowest portion of the spirally shaped bottom. The spirally shaped bottom can be shaped to direct the solid particles, or particulates, toward an exit aperture in the housing that allows the particulates and fluid to be flushed back into the septic tank.

The filter and housing can be substantially cylindrical in shape while the filter can be spaced from the perimeter of the housing to form an annularly shaped containment section for the solid particles. The solid particles can be substantially maintained between the filter and the perimeter of the housing and the venturi effect flushing system can be in fluid communication with the annularly shaped containment section.

Also included is a wastewater treatment system for the treatment of effluent wastewater typically including solid particles. The wastewater treatment system can comprise a tank for collecting the wastewater, a housing positioned substantially within the tank, a hollow filter positioned inside the housing, a wastewater discharge apparatus positioned inside the filter, a discharge tube extending through the housing, and a venturi effect flushing system positioned proximate the bottom of the housing.

The housing can include a bottom, a perimeter, at least one intake aperture positioned in the perimeter to accept the wastewater, and a first exit aperture positioned in the bottom. The filter can be shaped to substantially restrict the flow of the solid particles into the filter. The wastewater discharge apparatus is in fluid communication with the wastewater in the tank and the discharge tube is in fluid communication with the discharge apparatus and is positioned to transport filtered wastewater from the tank. The venturi effect flushing system can include a first velocity flow device that can be in fluid communication with the housing, the discharge apparatus, the discharge tube and the tank to return the solid particles restricted by the filter to the tank.

Also included is a method of treating wastewater. The method treats wastewater containing solid particles. The method comprises moving the wastewater from a collection tank into a housing positioned within the tank, filtering solid particles from the wastewater within the housing, transporting at least a portion of the filtered wastewater outside the tank, and using a portion of filtered wastewater to provide higher velocity fluid to an annular opening, creating a venturi effect, thereby moving the filtered solid particles within the housing back to the tank.

The use of the venturi effect on the interior of the housing can produce a circular motion of the wastewater within the housing. This method can further include using the venturi effect to move the filtered solid particles within the housing back to the tank. Additionally, the method can further include collecting the filtered solid particles proximate the bottom of the housing. Preferably, the steps of moving the wastewater, filtering the solid particles, and transporting the filtered wastewater outside the tank are performed by taking a small portion of flow from the pump to deliver the higher velocity fluid to the venturi effect apparatuses.

It is therefore the general object of the present invention to provide an improved wastewater treatment system.

Another object of the present invention is to provide an improved self-cleaning discharge system for a wastewater treatment facility.

Still another object of the present invention is to provide a venturi effect flushing system in a wastewater treatment facility Yet another object of the present invention is to provide a venturi effect flushing system in fluid communication with the housing of a discharge system positioned in a tank of a wastewater treatment system.

Another object of the present invention is to provide a venturi flushing system in fluid communication with a collection tank of a wastewater treatment system and a housing of a discharge system and a positioned in the tank.

Still another object of the present invention is to provide a wastewater treatment system including a venturi effect flushing system positioned to return solid particles restricted by a filter back to the tank containing the wastewater.

Other and further objects, features and advantages of the present invention will be readily apparent to those skilled in the art upon reading of the following disclosure when taken in conjunction with the accompanying drawings.

DETAILED DESCRIPTION OF THE INVENTION

Referring generally now to FIGS. 1-4, a wastewater treatment system is shown and generally designated by the numeral 10. The wastewater treatment system 10 is for processing wastewater 12, including wastewater 12 having solid suspended particles 14. The wastewater treatment system 10 is preferably designed to treat effluent wastewater produced from residential or commercial use. The wastewater treatment system 10 can filter the effluent wastewater and discharge the filtered effluent wastewater into a disposal area, such as a drain field or an effluent collection system.

The wastewater treatment system 10 includes a collection tank 16, which can be described as a septic tank 16, and a self cleaning discharge system 18. The tank 16 is typically positioned in the ground 11 and includes at least one feed conduit 17, such as plastic piping, that carries the wastewater to the tank 10. The discharge system 18 includes a housing 20, a filter 22, a wastewater discharge apparatus 24, and a venturi effect flushing system 26.

The housing 20 is preferably attached to the tank 16 and at least partially submerged in the wastewater 12 located in the tank 16. The housing 20 includes a bottom 28, a perimeter 30, at least one intake aperture 32 positioned in the perimeter 30 to allow flow of the wastewater 12 into the housing 20, and a first exit aperture 29 positioned proximate the bottom 28. The first exit aperture 29 is preferably positioned in the bottom 28, but can alternately be positioned in the perimeter 30 near the bottom 28. Multiple intake apertures 32 can be spaced around the perimeter 30. Preferably all of the intake apertures 32 are spaced from both the top and bottom layers of the wastewater 12. Other than the one or more apertures 32 and the venturi effect flushing system 26, the housing 20 can be fluidly sealed and is constructed of a material, such as plastic, that is substantially impervious to the wastewater 12. Additionally, the bottom 28 of the housing 20 can include a spiral shape positioned to direct the solid particles 14 that have been removed from suspension by the filter 22 toward the first exit aperture 29.

The filter 22, which can also be described as a screen 22, is preferably hollow and is positioned within the housing 20. The filter 22 is shaped to substantially restrict the flow of the solid particles 14 into the filter 22 and discharge apparatus 24. The filter 22 can take numerous shapes as known in the art. However, with the current invention the filter 22 can be smaller and have a smaller surface area design than present or available in conventional wastewater treatment designs. This smaller surface area design is realizable due to the self-cleaning of the discharge system 18. The self-cleaning of the discharge system 18 substantially eliminates the build up of solid particles 14 in the housing 20 and on the filter 22. As such, the surface area of the filter 22 does not experience blockage, as present in conventional designs, and does not need the extra surface area or larger design in order to maintain a proper fluid flow to the discharge system 18 during extend operation of the wastewater treatment system 10.

The wastewater discharge apparatus 24, which can, for example, be a fluid pump 24, can be positioned inside the filter 22 and can include a discharge tube 34. The pump 24 is in fluid communication with the wastewater 12 in the tank 16 and facilitates movement of the wastewater 12 within the wastewater treatment system 10. For example the discharge apparatus 24 facilitates movement of wastewater 12 from the tank 16 through the intake aperture(s) 32 in the housing 20 and into the filter 22. Then the wastewater 12 is moved through the discharge tube 34 back through the housing 20 and out of the tank 16 to the discharge area or drain field. The discharge apparatus 24 can include a fluid level sensor 36 positioned within the housing 20 or outside the house 20 to controlling the activation of the discharge apparatus 24.

The venturi effect flushing system 26 can include a first velocity flow device 40 that is preferably positioned proximate the bottom 28 of the housing 20. The first velocity flow device 40 is in fluid communication with the housing 20 and the tank 16 to return the solid particles 14 restricted by the filter 22 to the tank 16. Preferably, the venturi effect flushing system 26 incorporates the first exit aperture 29, which can also be described as a venturi effect orifice, integrally formed in the bottom 28 of the housing 20.

A second velocity flow device 42 can also be positioned in the housing 20 spaced from the first velocity flow device 40. The first and second velocity flow device 40 and 42 can impart a circular flow to the wastewater 12 within the housing 20 that facilities movement of the solid particles 14 to the bottom 28 of the housing 20 and back to the tank 16. The velocity flow devices 40 or 42 can be positioned proximate the lowest portion of the spirally shaped bottom 28 of the housing 20. Other velocity flow devices can be included to facilitate fluid movement and/or particle movement on the venturi effect flushing system 26

Figure 1:
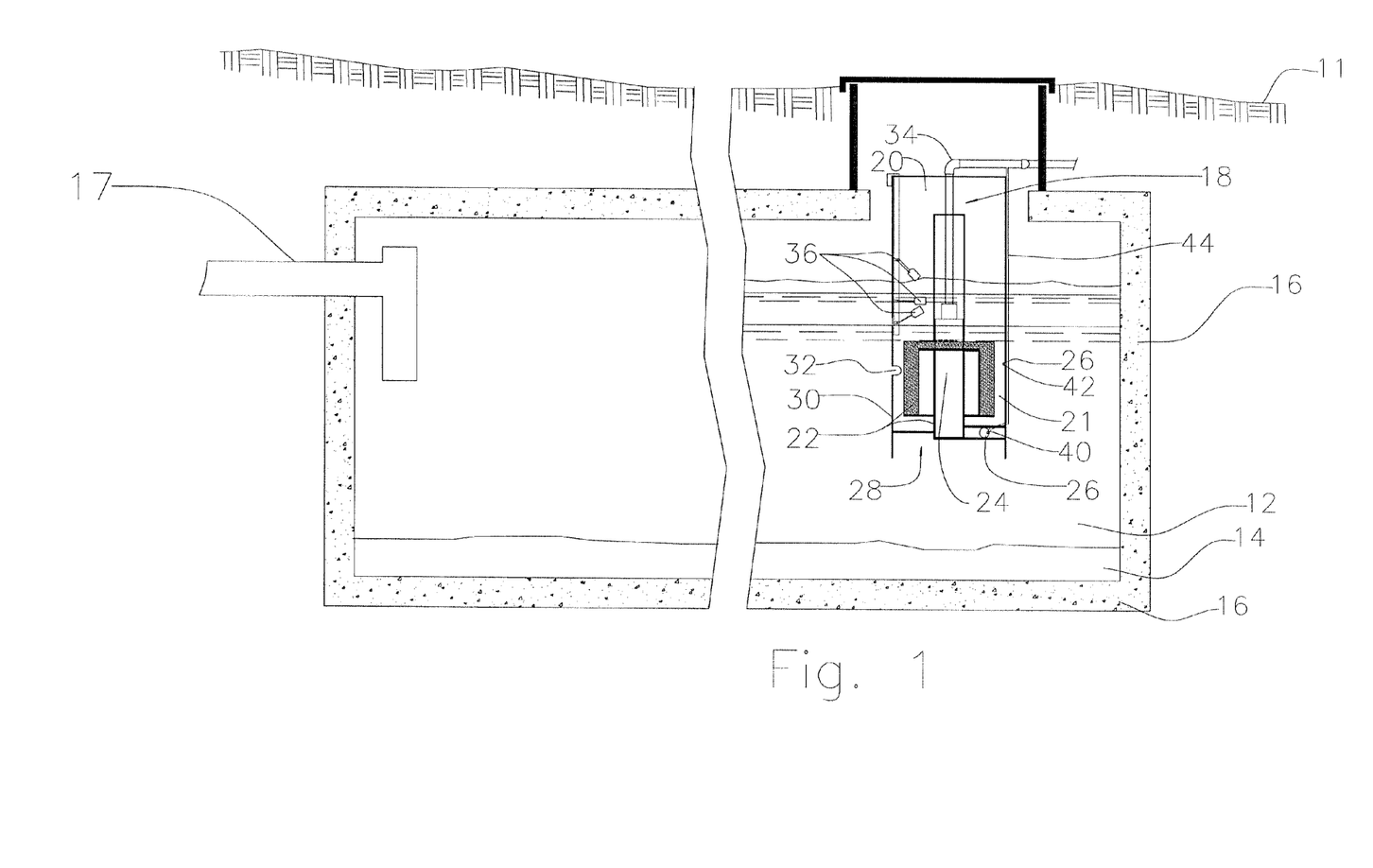
FIG. 1 is a schematic view of a self-cleaning discharge system made in accordance with the current invention.
Figure 1A:
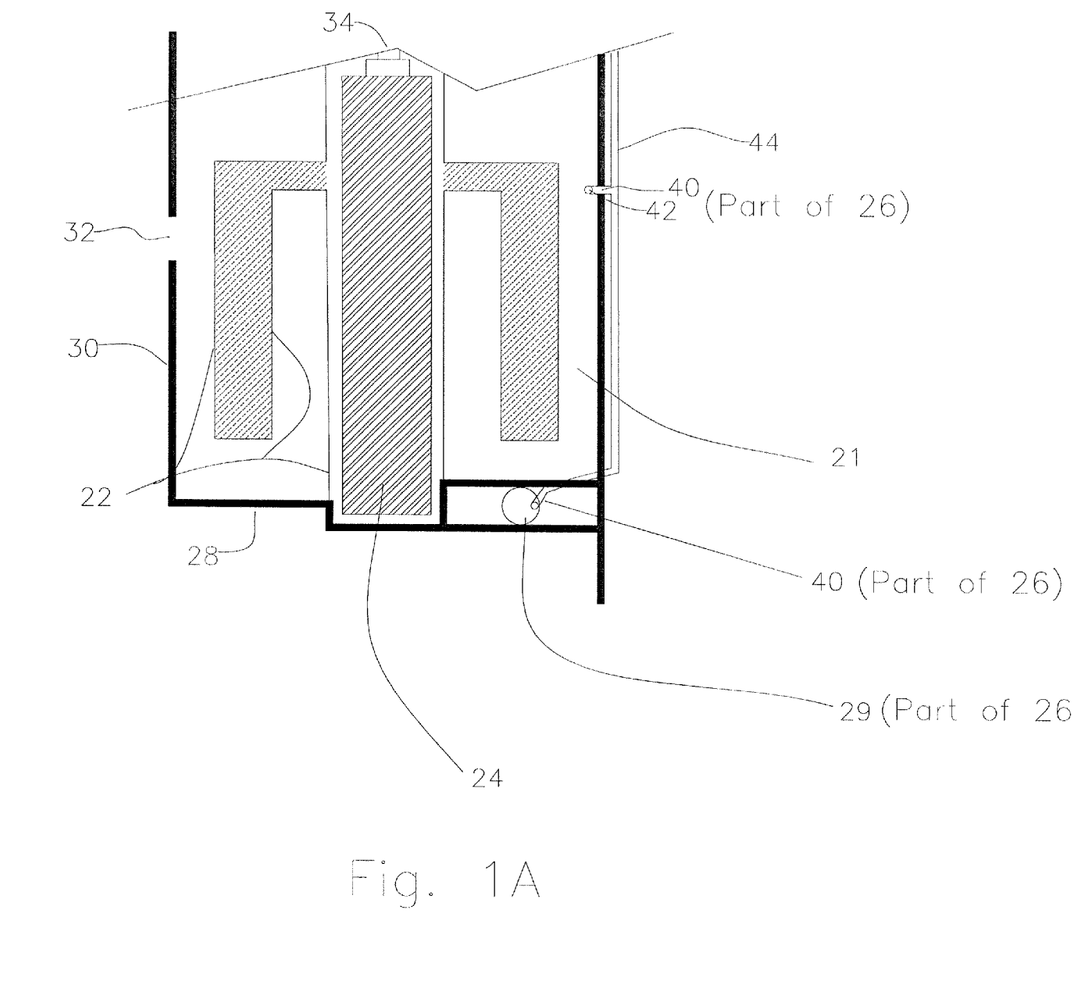
FIG. 1A is a partial front cross sectional view of the bottom of a self cleaning filter and housing.
Figure 2A:
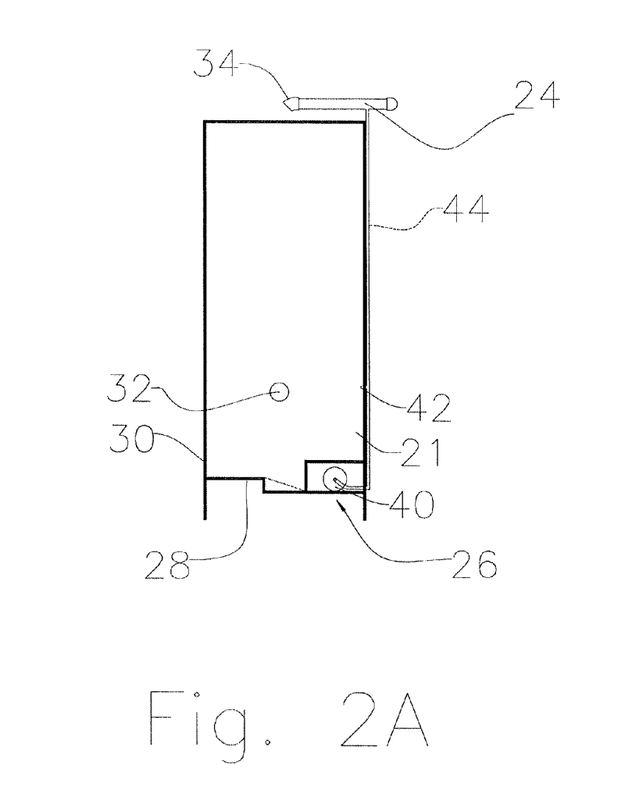
FIG. 2A is a partial front cross sectional view of a housing of a self-cleaning discharge system made in accordance with the current disclosure.
Figure 2B:
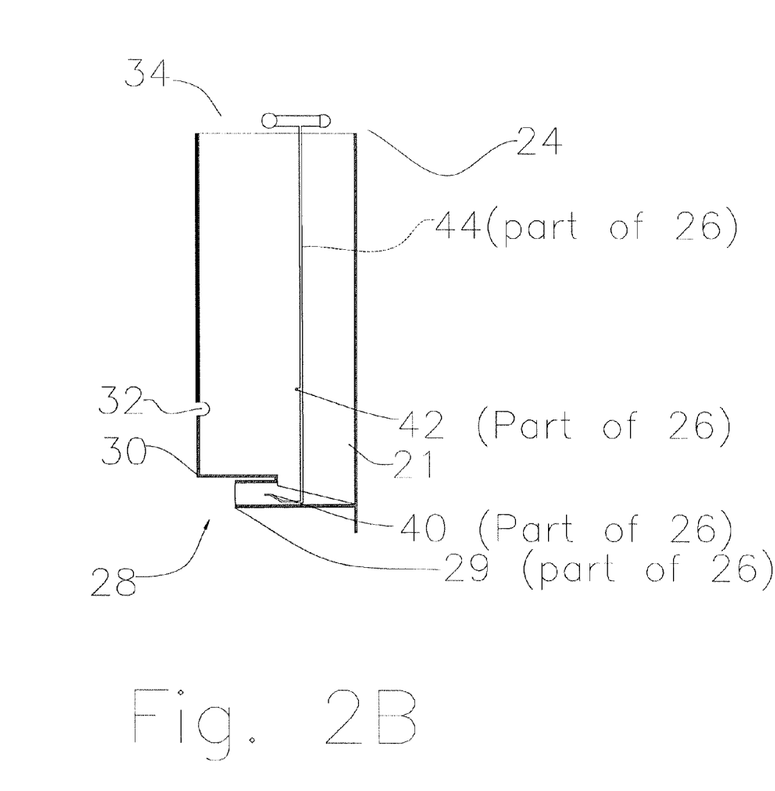
FIG. 2B is a partial side cross sectional view of a housing of a self-cleaning discharge system made in accordance with the current disclosure.
Figure 3:
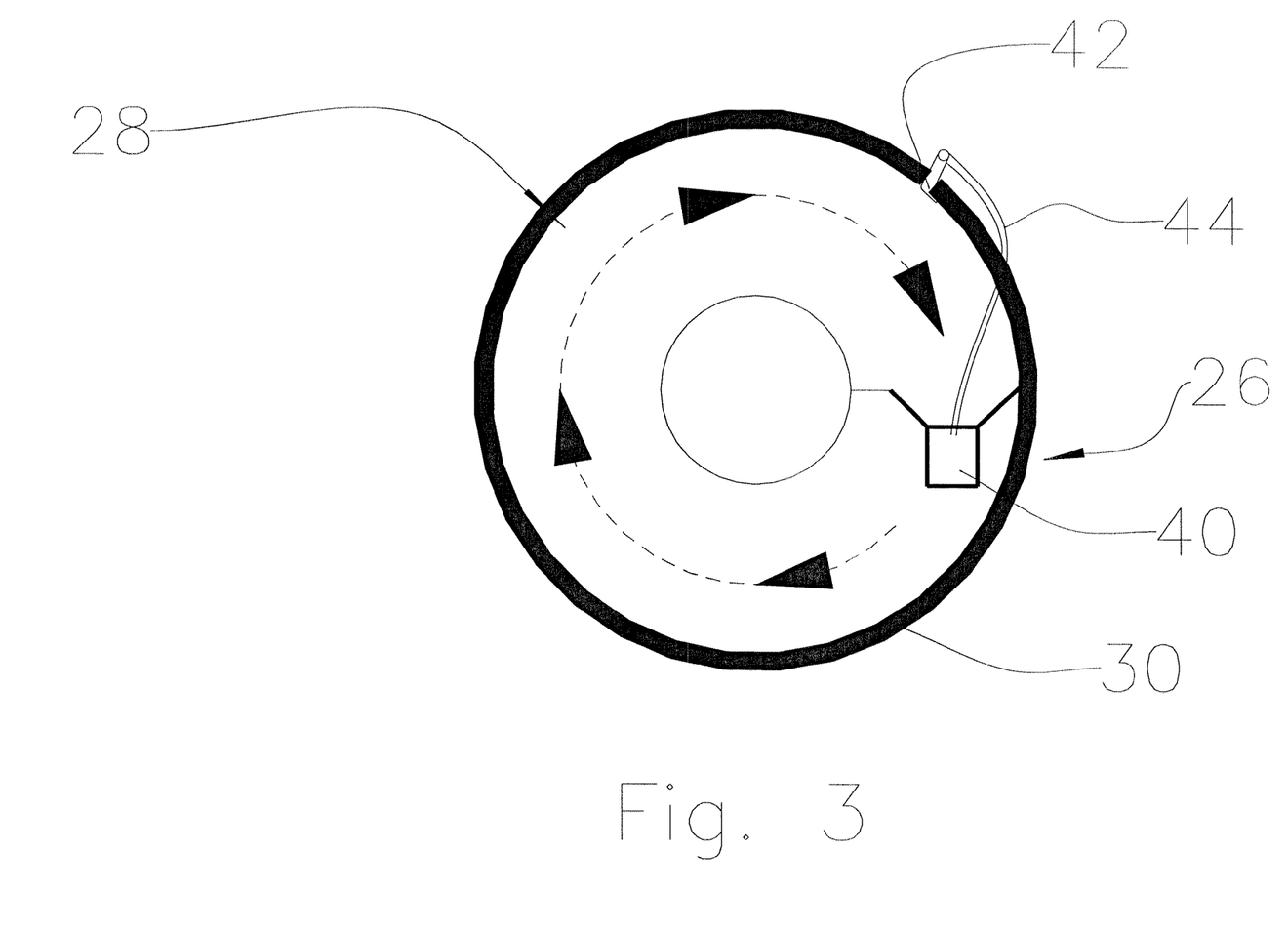
FIG. 3 is a top perspective view of a housing of a self-cleaning discharge system showing an example of the fluid rotation within the housing.
Figure 4:
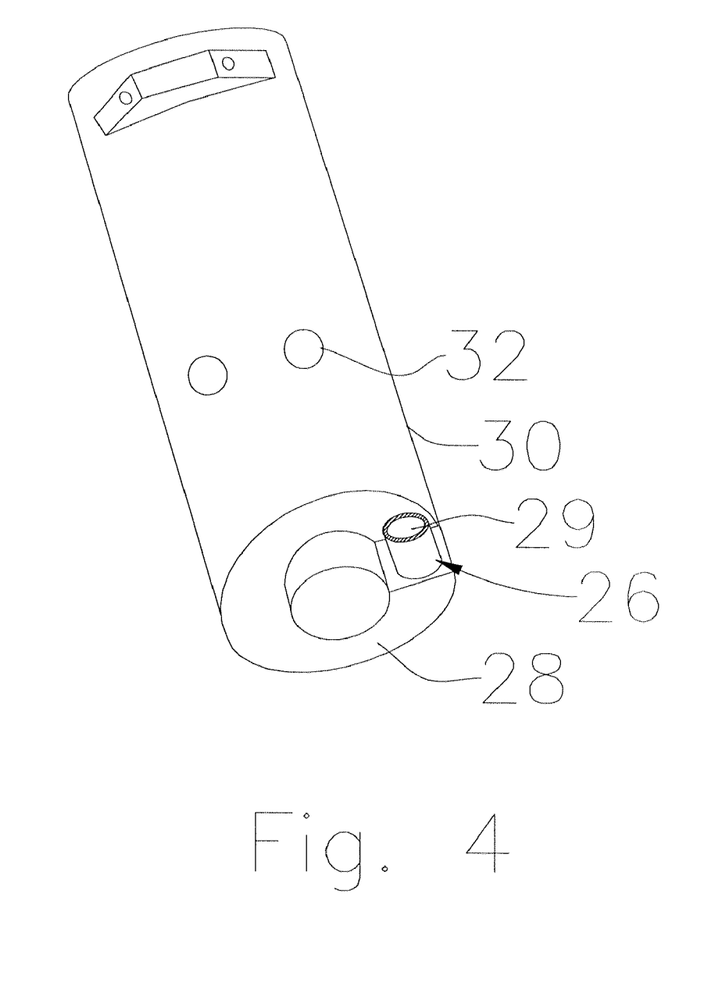
FIG. 4 is a bottom perspective view of a housing of a self-cleaning discharge system made in accordance with the current disclosure.
Figure 5:
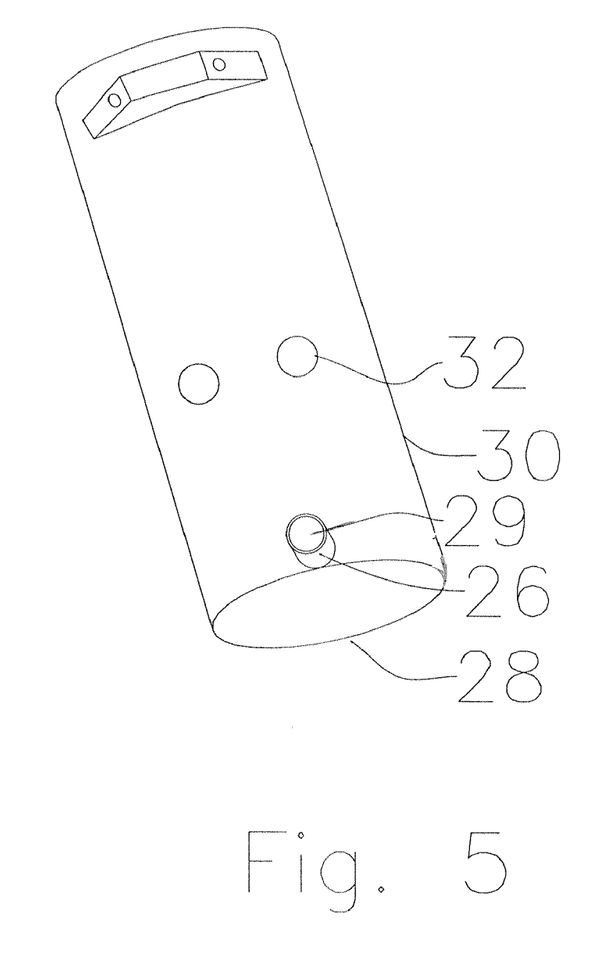
FIG. 5 is a schematic view of a self-cleaning discharge system made in accordance with the current invention.

The wastewater treatment system 10 preferably includes a supply tube 44 fluidly connected to the discharge apparatus 24 and the venturi effect flushing system 26. The supply tube 44 is positioned to direct a portion of the filtered wastewater through the venturi effect flushing system 26, and preferably through velocity flow devices 40 and/or 42. The supply tube 44 can be positioned substantially outside the housing 20, as seen in FIGS. 1-3, or can alternately be positioned substantially inside the housing 20. The supply tube 44 uses a portion of the filtered wastewater (or alternately another source of pressurized water or air) to elicit a fluid velocity and a pressure drop in the venturi effect flushing system 26, such that the venturi effect flushing system 26 will draw the filtered solid particles 14 back to the tank 16.

The filter 22 and housing 20 can be substantially cylindrical in shape. Additionally, the filter 22 can be spaced from the perimeter 30 of the housing 20 to form an annularly shaped containment section 21 for the solid particles 12. The solid particles 12 can be substantially maintained between the filter 22 and the perimeter 30 of the housing 20 in the annularly shaped containment section 21. The venturi effect flushing system 26 can be in fluid communication with the annularly shaped containment section 21 to induce movement of the solid particles 14 back to the tank 16. Preferably, the filter 22 does not extend to bottom 28. Solid particles 12 can move down the sides of the filter 22 and spacing the filter 22 from the bottom 28 facilitates the movement of the solid particles 12 to move the to venturi effect opening. Preferably, the filter includes a closed end to restrict fluid movement and movement of the solid particles 12 on or near the bottom 28 upward toward the discharge apparatus 24. This effectively prevents fluid from circumventing the filtering portion of the filter 22. Alternately, the end of the filter could have the same or similar filter properties as the sides to further filter the fluid and particles. A flap may be installed on the tank side of the venturi effect system to prevent particles from re-entering the housing during periods when the venturi effect system is not in operation.

Also included is a method of filtering effluent wastewater when the wastewater contains some solid particles. The method includes moving the wastewater from a collection tank into a housing positioned within the tank, filtering solid particles from the wastewater within the housing, transporting at least a portion of the filtered wastewater outside the tank, and using a reduction in pressure of the wastewater to move the filtered solid particles within the housing back to the tank.

The method can further include collecting the filtered solid particles proximate the bottom of the housing and using a venturi effect to move the filtered solid particles within the housing back to the tank. Additionally a discharge apparatus, such as a pump, can be used to move the wastewater within the system and facilitate movement of the wastewater into the velocity flow devices 40 or 42 to produce a circular wastewater motion within the housing.

Thus, although there have been described particular embodiments of the present invention of a new and useful SELF CLEANING PUMP VAULT FOR A SEPTIC TANK, it is not intended that such references be construed as limitations upon the scope of this invention except as set forth in the following claims.

What is claimed is:

1. A self cleaning discharge system for a wastewater treatment system having a tank for collecting wastewater, the wastewater including solid particles, the self cleaning discharge system comprising:

a housing including a perimeter, a bottom, at least one intake aperture positioned in the perimeter to accept the wastewater, and a first exit aperture positioned proximate the bottom;

a filter positioned inside the housing, the filter shaped to substantially restrict the flow of the solid particles into the filter;

a wastewater discharge apparatus positioned inside the filter and in fluid communication with the wastewater in the tank, the discharge apparatus including a discharge tube positioned to transport filtered wastewater outside of the tank; and a venturi effect flushing system including a first velocity flow device positioned proximate the bottom of the housing and in fluid communication with the housing and the tank to return the solid particles restricted by the filter to the tank.

2. The self cleaning discharge system of claim 1, wherein the first velocity flow device engages the bottom of the housing and directs fluid out of the first exit aperture.

3. The self cleaning discharge system of claim 2, wherein the venturi effect flushing system includes a second velocity flow device engaging the housing and spaced from the first velocity flow device, the first and second velocity flow devices imparting a circular flow to the wastewater within the housing.

4. The self cleaning discharge system of claim 3, wherein the filter and housing are substantially cylindrical in shape.

5. The self cleaning discharge system of claim 1, wherein:
the filter and housing are substantially cylindrical in shape; and
the filter is spaced from the perimeter of the housing to form an annularly shaped containment section for the solid particles.

6. The self cleaning discharge system of claim 5, wherein the solid particles are substantially maintained between the filter and the perimeter of the housing and the venturi effect flushing system is in fluid communication with the annularly shaped containment section.

7. The self cleaning discharge system of claim 1, wherein the bottom of the housing includes a spiral shape.

8. The self cleaning discharge system of claim 7, wherein the first velocity flow device is positioned in the housing proximate the lowest portion of the spirally shaped bottom.

9. The self cleaning discharge system of claim 8, wherein the spirally shaped bottom is shaped to direct the solid particles toward the first exit aperture.

10. The self cleaning discharge system of claim 1, further including a supply tube fluidly connected to the discharge apparatus and the venturi effect flushing system, the pressure tube positioned to direct a portion of the filtered wastewater through the first velocity flow device.

11. A wastewater treatment system for the treatment of effluent wastewater including solid particles, the wastewater treatment system comprising:
a tank for collecting the wastewater;
a housing positioned substantially within the tank, the housing including a perimeter, a bottom, at least one intake aperture positioned in the perimeter to accept the wastewater, and a first exit aperture positioned proximate the bottom;
a hollow filter positioned inside the housing, the filter shaped to substantially restrict the flow of the solid particles into the filter;
a wastewater discharge apparatus positioned inside the filter and in fluid communication with the wastewater in the tank;
a discharge tube extending through the housing, in fluid communication with the discharge apparatus, and positioned to transport filtered wastewater from the tank; and
a venturi effect flushing system including a first velocity flow device positioned proximate the bottom of the housing and in fluid communication with the housing and the tank to return the solid particles restricted by the filter to the tank.

12. The wastewater treatment system of claim 11, wherein:
the bottom of the housing includes a spiral shape;
the first velocity flow device engages the housing proximate the lowest portion of the spirally shaped bottom and directs fluid out of the first exit aperture; and
the spirally shaped bottom is positioned to direct the solid particles toward the first exit aperture.

13. The wastewater treatment system of claim 11, wherein the filter and housing are substantially cylindrical in shape; and
the filter is spaced from the perimeter of the housing to form an annularly shaped containment section for the solid particles.

14. The self cleaning discharge system of claim 13, wherein the solid particles are substantially maintained between the filter and the perimeter of the housing and the venturi effect flushing system is in fluid communication with the annularly shaped containment section.

15. The wastewater treatment system of claim 11, wherein the first velocity flow device is integrally formed in the bottom of the housing.

16. The self cleaning discharge system of claim 15, wherein the venturi effect flushing system includes a second velocity flow device engaging the housing and spaced from the first velocity flow device, the first and second velocity flow devices imparting a circular flow to the wastewater within the housing.

* * * * *